US011091185B2

(12) United States Patent
Williams et al.

(10) Patent No.: US 11,091,185 B2
(45) Date of Patent: Aug. 17, 2021

(54) STROLLER

(71) Applicant: Wonderland Switzerland AG, Steinhausen (CH)

(72) Inventors: Bruce L. Williams, Narvon, PA (US); Gregory Sellers, Christiana, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 16/417,657

(22) Filed: May 21, 2019

(65) Prior Publication Data

US 2019/0351929 A1    Nov. 21, 2019

Related U.S. Application Data

(60) Provisional application No. 62/674,052, filed on May 21, 2018, provisional application No. 62/703,153, filed on Jul. 25, 2018.

(51) Int. Cl.
*B62B 3/00* (2006.01)
*B62B 7/06* (2006.01)
*B62B 9/20* (2006.01)

(52) U.S. Cl.
CPC .............. *B62B 7/062* (2013.01); *B62B 9/203* (2013.01); *B62B 2205/003* (2013.01); *B62B 2205/26* (2013.01)

(58) Field of Classification Search
CPC .......... B62B 7/062; B62B 7/08; B62B 7/066; B62B 7/06; B62B 9/203; B62B 9/20; B62B 2205/26; B62B 2205/003; B62B 2205/20

See application file for complete search history.

(56) References Cited

U.S. PATENT DOCUMENTS 8,226,110 B2 * 7/2012 Liao ........................ B62B 7/062
                                                280/47.38
8,602,442 B2 * 12/2013 Li ............................ B62B 7/08
                                                280/647
8,672,341 B2 * 3/2014 Offord .................... B62B 7/008
                                                280/650

(Continued)

FOREIGN PATENT DOCUMENTS

CN          203094146 U       7/2013
CN          103373382 A      10/2013

(Continued)

*Primary Examiner* — James M Dolak
(74) *Attorney, Agent, or Firm* — Winston Hsu

(57) ABSTRACT

A stroller includes a front leg, a rear leg, a handle assembly, a locking component and a linking component. The rear leg is rotatably connected to the front leg. The handle assembly is rotatably connected to the front leg. The locking component is movably disposed on the handle assembly. The locking component is configured to engage with the front leg for restraining a rotating movement of the handle assembly relative to the front leg and further to be driven to disengage from the front leg for allowing the rotating movement of the handle assembly relative to the front leg. The linking component is rotatably connected to the handle assembly and the rear leg. The handle assembly drives the rear leg to rotate relative to the front leg forwardly when the handle assembly rotates relative to the front leg forwardly. Therefore, the stroller can be folded easily and compactly.

20 Claims, 7 Drawing Sheets

(56) References Cited

U.S. PATENT DOCUMENTS

| | | | | |
|---|---|---|---|---|
| 9,044,104 B2* | 6/2015 | Smith | ............... | E05D 7/00 |
| 9,193,372 B2* | 11/2015 | Haut | ............... | B62B 7/008 |
| 9,475,516 B1* | 10/2016 | Wang | ............... | B62B 7/10 |
| 9,540,027 B1* | 1/2017 | Hanson | ............... | B62B 7/086 |
| 9,637,154 B2* | 5/2017 | Liu | ............... | E05D 11/1007 |
| 9,638,243 B2* | 5/2017 | Li | ............... | F16C 11/10 |
| 9,701,333 B2* | 7/2017 | Liu | ............... | B62B 7/08 |
| 9,796,405 B2* | 10/2017 | Li | ............... | B62B 7/062 |
| 9,908,551 B2* | 3/2018 | Ransil | ............... | B62B 7/08 |
| 10,000,226 B2* | 6/2018 | Yi | ............... | B62B 9/20 |
| 10,144,442 B2* | 12/2018 | Ransil | ............... | B62B 7/08 |
| 10,155,528 B2* | 12/2018 | Zhong | ............... | B62B 7/083 |
| 10,286,941 B2* | 5/2019 | Li | ............... | B62B 7/062 |
| 10,399,589 B2* | 9/2019 | Horst | ............... | B62B 9/20 |
| 10,479,391 B2* | 11/2019 | Haut | ............... | B62B 7/064 |
| 10,526,000 B2* | 1/2020 | Horst | ............... | B62B 7/044 |
| 10,618,542 B2* | 4/2020 | Cai | ............... | B62B 7/10 |
| 10,766,517 B2* | 9/2020 | Cheng | ............... | B62B 9/26 |
| 10,787,188 B2* | 9/2020 | Popp | ............... | B62B 9/20 |
| 10,822,012 B2* | 11/2020 | Liu | ............... | A47D 1/06 |
| 10,882,546 B2* | 1/2021 | Wang | ............... | B62B 7/08 |
| 10,894,555 B2* | 1/2021 | Huang | ............... | B62B 7/062 |
| 10,926,785 B2* | 2/2021 | Ambar | ............... | B62B 7/142 |
| 2017/0144687 A1 | 5/2017 | Li | | |
| 2017/0297600 A1 | 10/2017 | Zhong | | |
| 2018/0001920 A1 | 1/2018 | Li | | |

FOREIGN PATENT DOCUMENTS

| | | |
|---|---|---|
| CN | 205273574 U | 6/2016 |
| DE | 10 2015 112 332 A1 | 2/2017 |
| EP | 2 949 542 A2 | 12/2015 |
| WO | 2018/009971 A1 | 1/2018 |

* cited by examiner

STROLLER

CROSS REFERENCE TO RELATED APPLICATIONS

This application claims the benefit of U.S. Provisional Patent Application No. 62/674,052 filed on May 21, 2018 and US Provisional Patent Application No. 62/703,153 filed on Jul. 25, 2018, which are hereby incorporated by reference in its entirety.

BACKGROUND OF THE INVENTION

1. Field of the Invention

The present invention relates to a child product, and more particularly to a stroller capable of being folded easily and compactly.

2. Description of the Prior Art

With advancement of technology and development of economy, there are more and more consumer goods available in the market to bring convenience into people's lives. For example, a stroller is indispensable for carrying an infant or a child. The stroller can not only provide a safe and comfortable environment for the infant or the child but also bring convenience for a caregiver to carry the infant or the child when travelling. The stroller usually has foldable structure, so that the stroller can be folded to reduce an occupied space of the stroller for transportation or storage of the stroller. However, some of the conventional strollers are not lightweight and cannot be folded compactly, which makes it difficult to carry or stow the strollers when travelling, especially when using public transportation. In addition, some of the conventional strollers have complicated structure and folding sequence, which makes it difficult to unfold or fold the strollers.

Therefore, there is a need to provide an improved stroller for solving the aforementioned problems.

SUMMARY OF THE INVENTION

It is an objective of the present invention to provide a stroller capable of being folded easily and compactly.

In order to achieve the aforementioned objective, the present invention discloses a stroller. The stroller includes a front leg, a rear leg, a handle assembly and a locking component. The rear leg is rotatably connected to the front leg. The handle assembly is rotatably connected to one of the front leg and the rear leg. The locking component is movably disposed on the handle assembly. The locking component is configured to engage with the one of the front leg and the rear leg for restraining a rotating movement of the handle assembly relative to the one of the front leg and the rear leg and further to be driven to disengage from the one of the front leg and the rear leg for allowing the rotating movement of the handle assembly relative to the one of the front leg and the rear leg. The handle assembly and the one of the front leg and the rear leg cooperatively engage with another of the front leg and the rear leg for restraining a rotating movement of the another of the front leg and the rear leg relative to the one of the front leg and the rear leg when the locking component engages with the one of the front leg and the rear leg.

According to an embodiment of the present invention, the one of the front leg and the rear leg includes an engaging component configured to engage with the locking component.

According to an embodiment of the present invention, the handle assembly includes a first abutting portion. The one of the front leg and the rear leg includes a second abutting portion, and the another of the front leg and the rear leg is clamped by the first abutting portion and the second abutting portion cooperatively for restraining the rotating movement of the another of the front leg and the rear leg relative to the one of the front leg and the rear leg.

According to an embodiment of the present invention, the stroller further includes a linking component rotatably connected to the handle assembly and the another of the front leg and the rear leg. A rotating connection of the linking component and the another of the front leg and the rear leg and a rotating connection of the front leg and the rear leg are located in different positions. A rotating connection of the handle assembly and the linking component and a rotating connection of the handle assembly and the one of the front leg and the rear leg are located in different positions, and the handle assembly drives the another of the front leg and the rear leg to rotate relative to the one of the front leg and the rear leg by the linking component when the handle assembly rotates relative to the one of the front leg and the rear leg.

According to an embodiment of the present invention, the stroller further includes a resilient component abutting against the locking component to bias the locking component to engage with the one of the front leg and the rear leg.

According to an embodiment of the present invention, the stroller further includes a connecting component connected to the locking component and configured to drive the locking component to disengage from the one of the front leg and the rear leg.

According to an embodiment of the present invention, the stroller further includes an operating component movably disposed on the handle assembly and connected to the connecting component, and the operating component drives the locking component to disengage from the one of the front leg and the rear leg by the connecting component when the operating component is operated.

According to an embodiment of the present invention, the handle assembly includes a lower handle portion and an upper handle portion. The stroller further includes a handle pivoting assembly disposed between the upper handle portion and the lower handle portion. The handle pivoting assembly is configured to restrain or allow a rotating movement of the upper handle portion relative to the lower handle portion.

According to an embodiment of the present invention, the connecting component is further connected to one of the handle pivoting assembly and the upper handle portion, and the one of the handle pivoting assembly and the upper handle portion drives the locking component to disengage from the one of the front leg and the rear leg by the connecting component during the rotating movement of the upper handle portion relative to the lower handle portion.

According to an embodiment of the present invention, the stroller further includes an operating component connected to the handle pivoting assembly and configured to unlock the handle pivoting assembly for allowing the rotating movement of the upper handle portion relative to the lower handle portion when the operating component is operated.

According to an embodiment of the present invention, the operating component is further connected to the connecting component, and the operating component further drives the locking component to disengage from the one of the front leg and the rear leg by the connecting component when the operating component is operated.

In order to achieve the aforementioned objective, the present invention further discloses a stroller. The stroller includes a front leg, a rear leg, a handle assembly, a locking component and a linking component. The rear leg is rotatably connected to the front leg. The handle assembly is rotatably connected to the front leg. The locking component is movably disposed on the handle assembly. The locking component is configured to engage with the front leg for restraining a rotating movement of the handle assembly relative to the front leg and further to be driven to disengage from the front leg for allowing the rotating movement of the handle assembly relative to the front leg. The linking component is rotatably connected to the handle assembly and the rear leg. The handle assembly drives the rear leg to rotate relative to the front leg forwardly when the handle assembly rotates relative to the front leg forwardly.

According to an embodiment of the present invention, the stroller further includes an engaging component disposed on the front leg and configured to engage with the locking component.

According to an embodiment of the present invention, the stroller further includes a connecting component connected to the locking component and configured to drive the locking component to disengage from the front leg.

According to an embodiment of the present invention, the stroller further includes an operating component movably disposed on the handle assembly and connected to the connecting component, and the operating component drives the locking component to disengage from the front leg by the connecting component when the operating component is operated.

According to an embodiment of the present invention, the handle assembly includes a lower handle portion and an upper handle portion. The stroller further includes a handle pivoting assembly disposed between the upper handle portion and the lower handle portion. The handle pivoting assembly is configured to restrain or allow a rotating movement of the upper handle portion relative to the lower handle portion.

According to an embodiment of the present invention, the connecting component is further connected to one of the handle pivoting assembly and the upper handle portion, and the one of the handle pivoting assembly and the upper handle portion drives the locking component to disengage from the front leg by the connecting component during the rotating movement of the upper handle portion relative to the lower handle portion.

According to an embodiment of the present invention, the stroller further includes an operating component connected to the handle pivoting assembly and configured to unlock the handle pivoting assembly for allowing the rotating movement of the upper handle portion relative to the lower handle portion when the operating component is operated.

According to an embodiment of the present invention, the operating component is further connected to the connecting component, and the operating component further drives the locking component to disengage from the front leg by the connecting component when the operating component is operated.

According to an embodiment of the present invention, a rotating connection of the linking component and the rear leg and a rotating connection of the front leg and the rear leg are located in different positions. A rotating connection of the handle assembly and the linking component and a rotating connection of the handle assembly and the front leg are located in different positions, and the handle assembly drives the rear leg to rotate relative to the front leg in a first pivoting direction by the linking component when the handle assembly rotates relative to the front leg in a second pivoting direction opposite to the first pivoting direction.

In summary, the present invention utilizes the locking component to allow or restrain the rotating movement of the handle assembly relative to the front leg and further utilizes the rotating movement of the handle assembly relative to the front leg to drive the rear leg to rotate relative to the front leg by the linking component. Therefore, the entire stroller is allowed to be folded easily and compactly by disengaging the locking component and then rotating the handle assembly relative to the front leg, which brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct connection. Thus, if a first device is connected to a second device, that connection may be through a direct connection, or through an indirect connection via other devices and connections.

Figure 1:
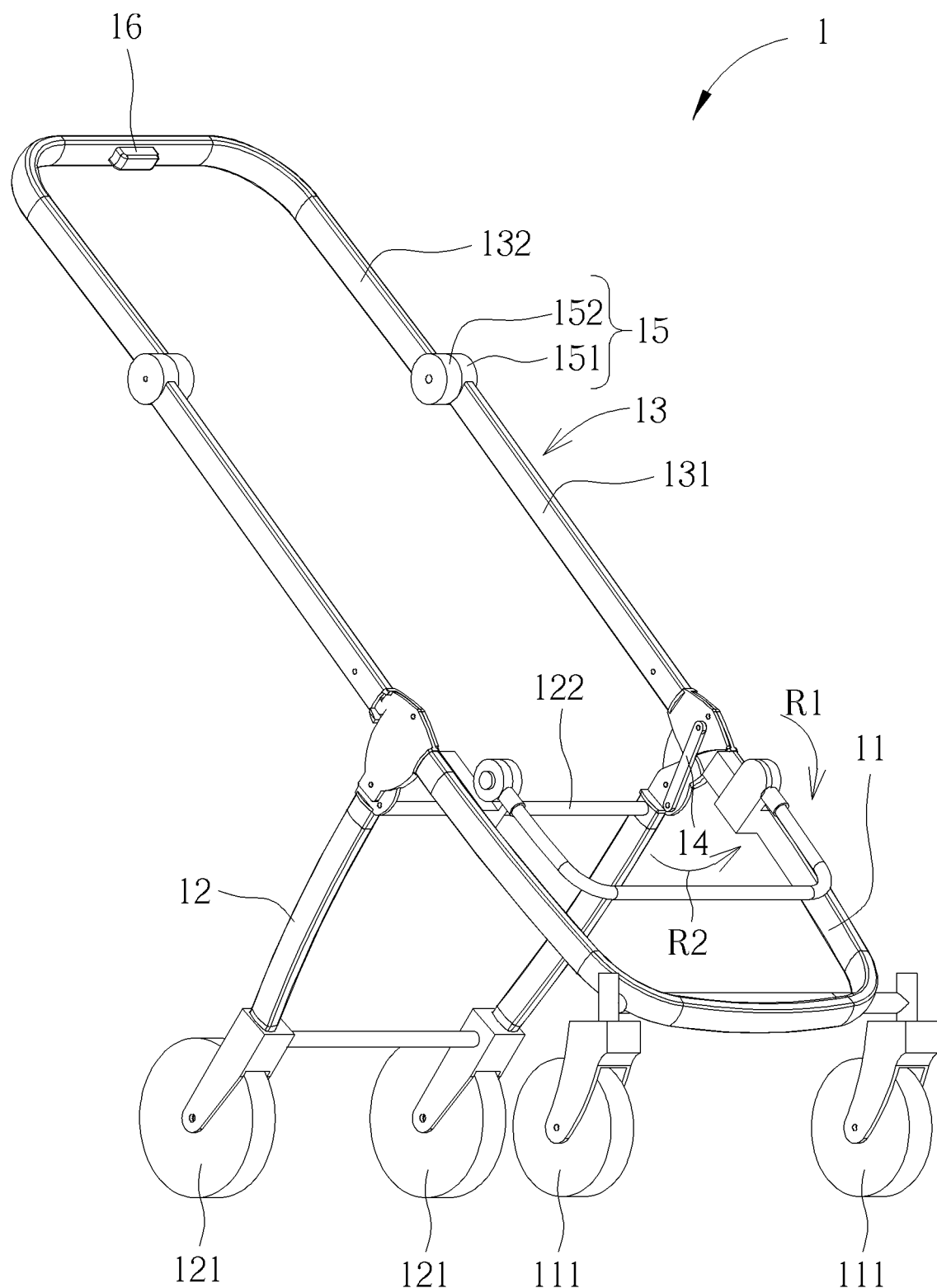
FIG. 1 is a schematic diagram of a stroller according to a first embodiment of the present invention.
Figure 2:
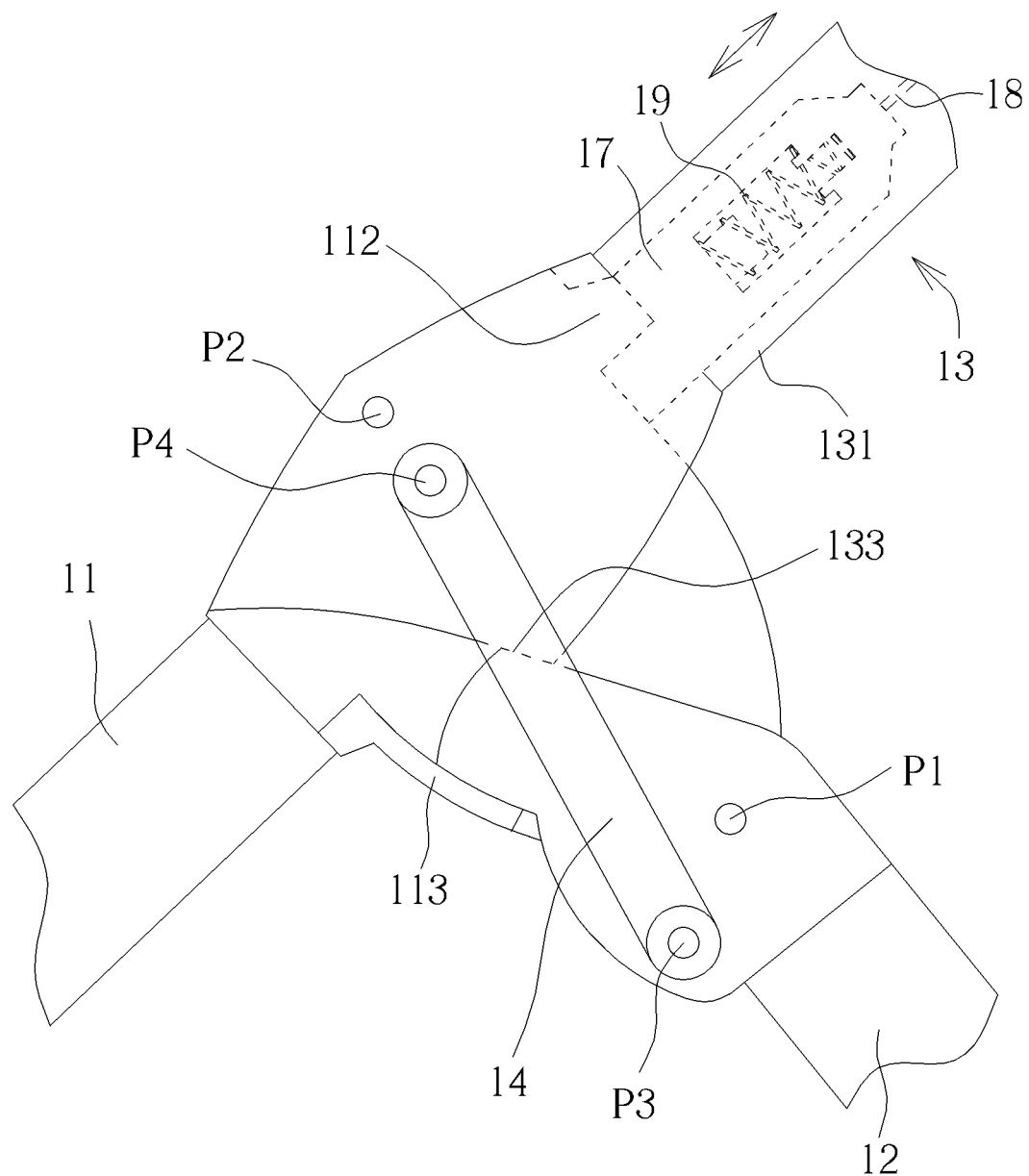
FIG. 2 is a partial enlarged diagram of the stroller according to the first embodiment of the present invention.

Please refer to FIG. 1 and FIG. 2. FIG. 1 is a schematic diagram of a stroller 1 according to a first embodiment of the present invention. FIG. 2 is a partial enlarged diagram of the stroller 1 according to the first embodiment of the present invention. As shown in FIG. 1 and FIG. 2, the stroller 1 includes a front leg 11, a rear leg 12, a handle assembly 13 and a linking component 14. The front leg 11 is provided with two front wheels 111. The rear leg 12 is provided with two rear wheels 121. A child carrier, which is not shown in the figures, can be disposed on the stroller 1 for accommodating a child. The rear leg 12 is rotatably connected to the front leg 11. The handle assembly 13 is rotatably connected to the front leg 11. The linking component 14 is rotatably connected to the handle assembly 13 and the rear leg 12. Therefore, when the handle assembly 13 rotatably folds relative to the front leg 11 forwardly in a first pivoting direction R1, e.g. a clockwise direction in this embodiment, the handle assembly 13 drives the rear leg 12 by the linking component 14 to rotatably fold relative to the front leg 11 forwardly in a second pivoting direction R2 opposite to the first pivoting direction R1, e.g. a counterclockwise direction in this embodiment, so as to achieve a compact and easy folding operation of the stroller 1.

In this embodiment, the rear leg 12 and the handle assembly 13 can be directly pivoted to the front leg 11 at a first pivoting point P1 and a second pivoting point P2 respectively, and the linking component 14 can be directly pivoted to the rear leg 12 and the handle assembly 11 at a third pivoting point P3 and a fourth pivoting point P4 respectively. A rotating connection or a rotating joint, i.e., the third pivoting point P3, of the linking component 14 and the rear leg 11 and a rotating connection or a rotating joint, i.e., the first pivoting point P1, of the front leg 11 and the rear leg 12 are located in different positions. A rotating connection or a rotating joint, i.e., the fourth pivoting point P4, of the handle assembly 13 and the linking component 14 and a rotating connection or a rotating joint, i.e., the second pivoting point P2, of the handle assembly 13 and the front leg 11 are located in different positions.

However, it is not limited to this embodiment. For example, in another embodiment, the rear leg and the handle assembly can be rotatably connected to the front leg via another mechanism, such as a central hub, so that the rear leg and the handle assembly can rotatably fold relative to the front leg, and the linking component also can be rotatably connected to the rear leg and the handle assembly via another mechanism, such a lever.

However, the structures and the configurations of the front leg, the rear leg, the handle assembly and the linking component are not limited to this embodiment. For example, in another embodiment, the front leg can be rotatably connected to the rear leg, the handle assembly can be rotatably connected to the rear leg instead of the front leg, and the linking component can be rotatably connected to the front leg and the handle assembly. Therefore, when the handle assembly rotatably folds relative to the rear leg forwardly in the counterclockwise direction, the handle assembly drives the front leg by the linking component to rotatably fold relative to the rear leg rearwardly in the clockwise direction, so as to achieve a compact and easy folding operation of the stroller.

As shown in FIG. 1, the handle assembly 13 includes a lower handle portion 131 and an upper handle portion 132. The stroller 1 further includes a handle pivoting assembly 15 disposed between the upper handle portion 132 and the lower handle portion 131. The handle pivoting assembly 15 is configured to restrain or allow a rotating movement of the upper handle portion 132 relative to the lower handle portion 131. In this embodiment, the handle pivoting assembly 15 can include a first body 151, a second body 152 and a movable component which is not shown in the figure. The first body 151 is connected to the lower handle portion 131. The second body 152 is connected to the upper handle portion 132 and rotatably combined with the first body 151. The movable component is movably disposed on the second body 152 and configured to engage with the first body 151 for restraining rotating movement of the second body 152 relative to the first body 151, or to disengage from the first body 151 for allowing the rotating movement of the second body 152 relative to the first body 151. When the movable component is disengaged from the first body 151, the upper handle portion 132 can be operated to rotatably fold relative to the lower handle portion 131 by the rotating movement of the second body 152 relative to the first body 151.

However, the structure and the configuration of the handle pivoting assembly are not limited to this embodiment. Any structure or mechanism which can restrain or allow the rotating movement of the upper handle portion relative to the lower handle portion is included within the scope of the present invention.

Preferably, in this embodiment, the stroller 1 further includes an operating component 16 connected to the handle pivoting assembly 15 and configured to unlock the handle pivoting assembly 15 for allowing the rotating movement of the upper handle portion 132 relative to the lower handle portion 131 when the operating component 16 is operated. In this embodiment, the operating component 16 can be connected to the movable component of the handle pivoting assembly 15, so as to drive the movable component to disengage from the first body 151 for allowing the rotating movement of the upper handle portion 132 relative to the lower handle portion 131. However, the present invention is not limited to this embodiment. In another embodiment, the operating component can be omitted, and the movable component can be pushed to disengage from the first body by an inclined surface disposed on the first body.

As shown in FIG. 1 and FIG. 2, the stroller 1 further includes a locking component 17, a connecting component 18 and a resilient component 19. The locking component 17 is movably disposed on the lower handle portion 131 of the handle assembly 13. The connecting component 18 is connected to the locking component 17. The front leg 11 includes an engaging component 112 corresponding to the locking component 17. The locking component 17 is configured to engage with the engaging component 112 of the front leg 11 for restraining a rotating movement of the lower handle portion 131 of the handle assembly 13 relative to the front leg 11 and further to be driven to disengage from the engaging component 112 of the front leg 11 for allowing the rotating movement of the lower handle portion 131 of the handle assembly 13 relative to the front leg 11. The connecting component 18 is configured to drive the locking component 17 to disengage from the engaging component 112 of the front leg 11. The resilient component 19 abuts against the locking component 17 to bias the locking component 17 to engage with the engaging component 112 of the front leg 11. When the lower handle portion 131 is fully unfolded relative to the front leg 11, the resilient component 19 can drive the locking component 17 to engage with the engaging component 112, which can effectively prevent an unintentional folding operation of the lower handle portion 131 relative to the front leg 11.

Figure 11:
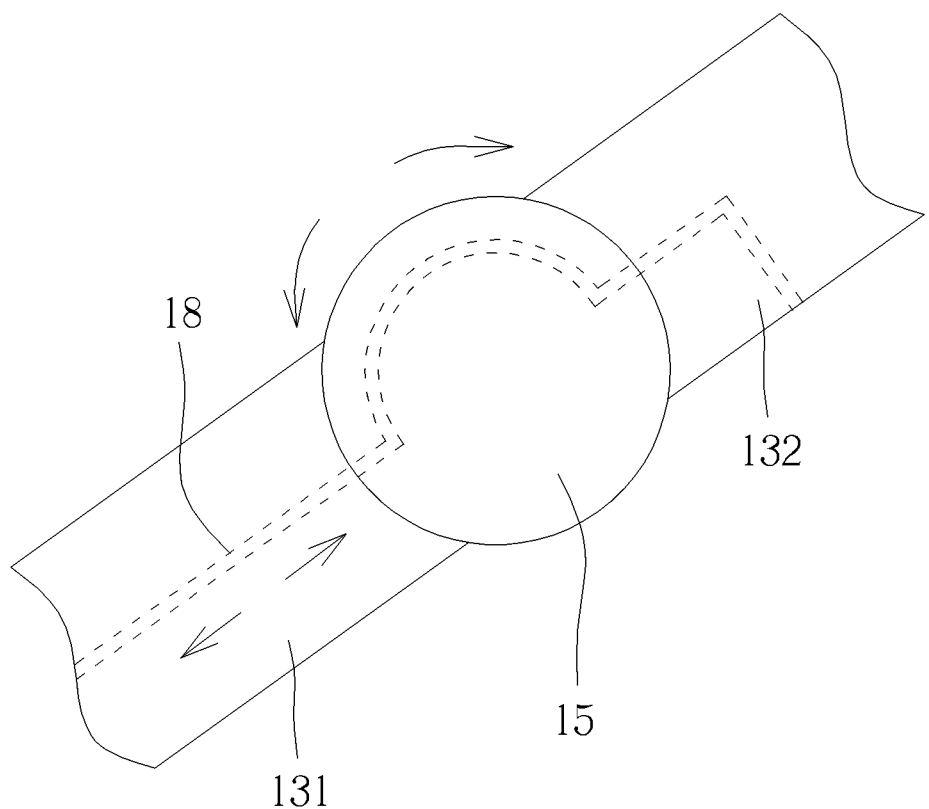
FIG. 11 is another partial enlarged diagram of the stroller according to the first embodiment of the present invention.

Please refer to FIG. 11. FIG. 11 is another partial enlarged diagram of the stroller 1 according to the first embodiment of the present invention. As shown in FIG. 11, in this embodiment, the connecting component 18 can be further connected to the upper handle portion 132 of the handle pivoting assembly 13. Therefore, when the upper handle portion 132 rotates relative to the lower handle portion 131, the upper handle portion 132 of the handle pivoting assembly 13 can pull the locking component 17 to disengage from the engaging component 112 by the connecting component 18.

However, the present invention is not limited to this embodiment. The connecting component can be connected to the locking component and one of the first body, the second body, or a pivoting mechanism of the handle pivoting assembly and can be driven to move by the one of the first body, the second body, or a pivoting mechanism of the handle pivoting assembly. For example, in another embodiment, an end of the connecting component can be connected to the pivoting mechanism, and another end of the connecting component can be connected to the locking component. The pivoting mechanism moves to drive the connecting component to disengage the locking component from the engaging component when the upper handle portion rotates relative to the lower handle portion. In such a way, the stroller of the present invention is unlocked by rotating the upper handle portion relative to the lower handle portion.

Alternatively, in another embodiment, the connecting component can be connected to the operating component and the locking component, so that the operating component can pull the locking component to disengage from the engaging component by the connecting component when the operating component is operated. In other words, in this embodiment, when the operating component is operated, the upper handle portion and the lower handle portion can be rotatably folded relative to the lower handle portion and the front leg, respectively, which achieves a purpose of unlocking the handle pivoting assembly and the stroller.

Alternatively, in another embodiment, the upper handle portion can be fixed with the lower handle portion and cannot be folded relative to the lower handle portion, and the connecting component can be connected to the operating component. Therefore, the operating component can drive the locking component by the connecting component to disengage from the engaging component when the operating component is operated.

Besides, the handle assembly 13 further includes a first abutting portion 133. The front leg 11 includes a second abutting portion 113. The rear leg 12 is clamped by the first abutting portion 133 and the second abutting portion 113 cooperatively for restraining the rotating movement of the rear leg 12 relative to the front leg 11 when the lower handle portion 131 is fully unfolded relative to the front leg 11, which can effectively prevent an unintentional folding operation of the rear leg 12 relative to the front leg 11.

Figure 5:
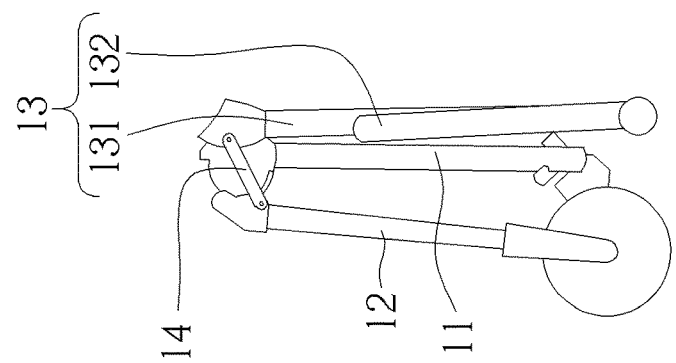
FIG. 3 to FIG. 5 are diagrams of the stroller in different states according to the first embodiment of the present invention.
Figure 4:
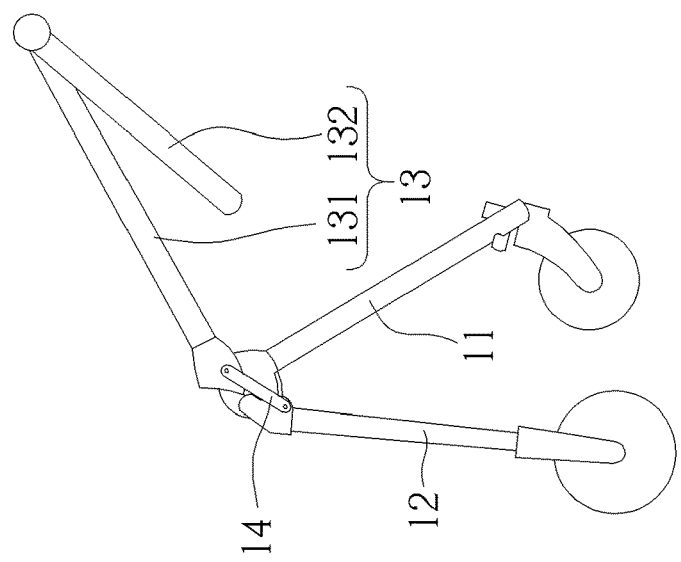
Figure 3:
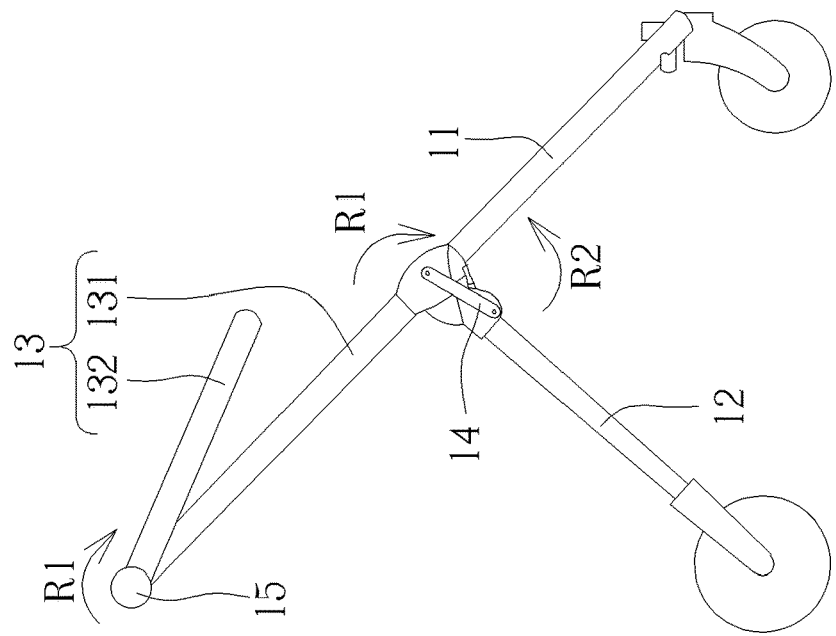
Figure 6:
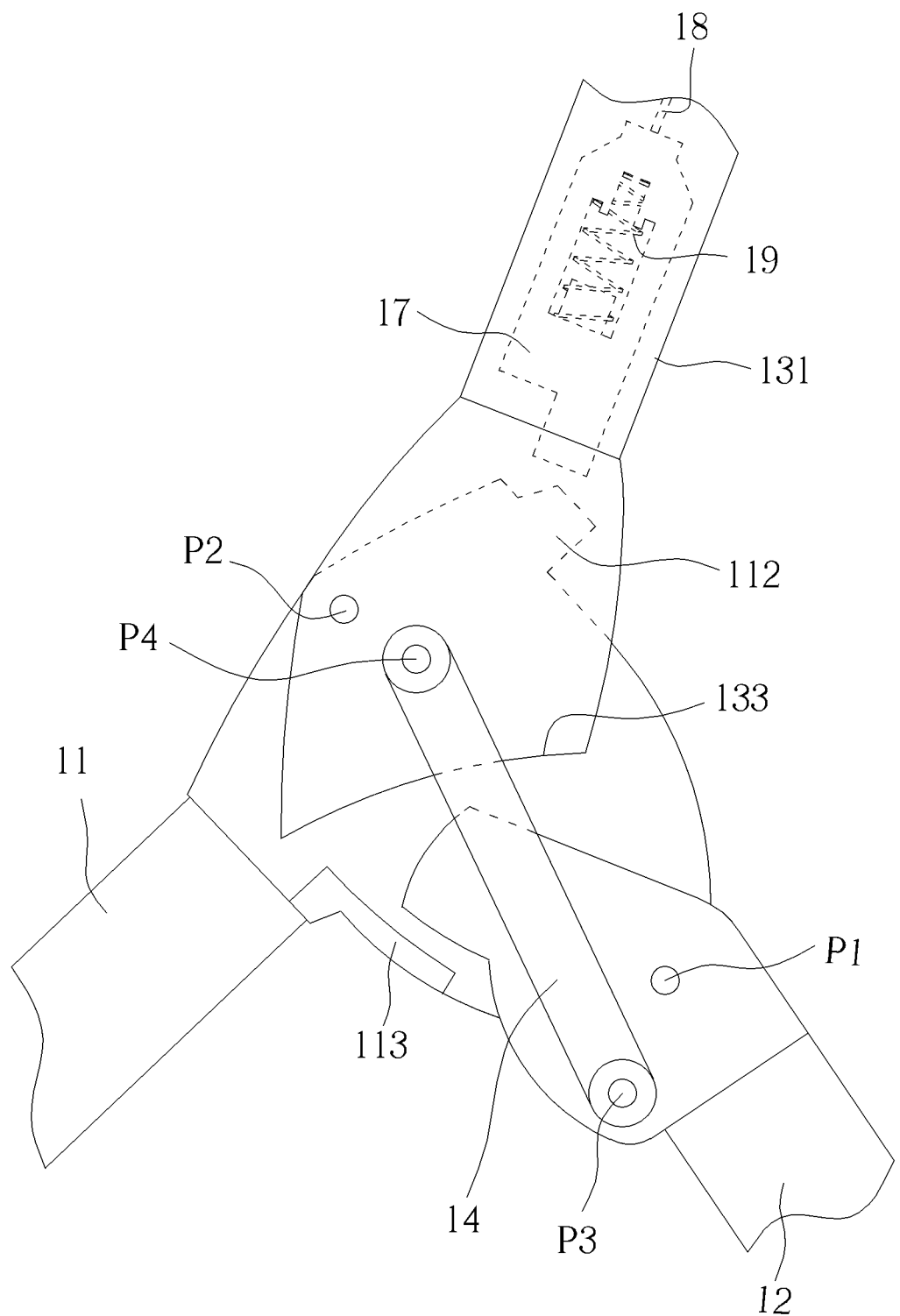
FIG. 6 and FIG. 7 are partial enlarged diagrams of the stroller in different states according to the first embodiment of the present invention.
Figure 7:
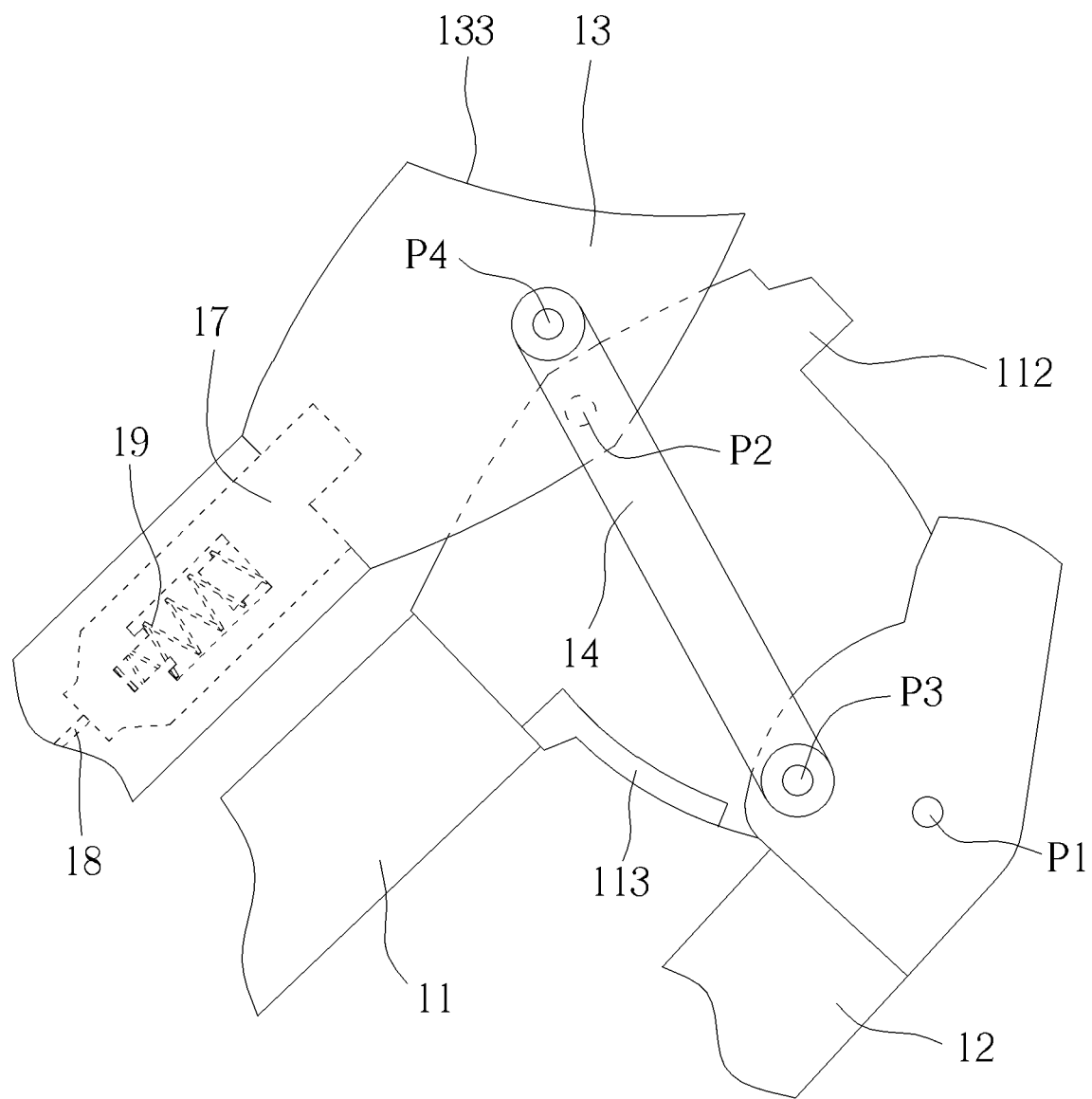

Description for the folding and unfolding operation is provided as follows. Please refer to FIG. 1 to FIG. 7. FIG. 3 to FIG. 5 are diagrams of the stroller 1 in different states according to the first embodiment of the present invention. FIG. 6 and FIG. 7 are partial enlarged diagrams of the stroller 1 in different states according to the first embodiment of the present invention. When it is desired to fold the stroller 1, the operating component 16 can be operated to unlock the handle pivoting assembly 15 to allow the rotating movement of the upper handle portion 132 relative to the lower handle portion 131. Afterwards, when the upper handle portion 132 rotatably folds relative to the lower handle portion 131 to a position shown in FIG. 3 in the first pivoting direction R1, the locking component 17 is driven to disengage from the engaging component 112. At this moment, a user can rotatably fold the entire handle assembly 13 relative to the front leg 11 in the first pivoting direction R1 to drive the rear leg 12 to rotatably fold relative to the front leg 11 in the second pivoting direction R2 or lift a fold handle 122 disposed on the rear leg 12 to drive the rear leg 12 and the handle assembly 13 to rotatably fold relative to the front leg 11 in two opposite pivoting directions by gravity until the stroller 1 is compactly folded as shown in FIG. 5 to achieve the folding operation of the stroller 1.

On the other hand, when it is desired to unfold the stroller 1, it only has to rotatably unfold the handle assembly 13 relative to the front leg 11. During unfolding operation of the handle assembly 13, the handle assembly 13 drives the rear leg 12 by the linking component 14 to rotatably unfold relative to the front leg 11. When the stroller 1 is unfolded as shown in FIG. 3, the resiliently deformed resilient component 19 can drive the locking component 17 to engage with the engaging component 112 for restraining the rotating movement of the lower handle portion 131 relative to the front leg 11, and the rear leg 12 can be clamped by the first abutting portion 133 and the second abutting portion 113 cooperatively for restraining the rotating movement of the rear leg 12 relative to the front leg 11. Afterwards, the user can unfold the upper handle portion 132 relative to the lower handle portion 131 to achieve the unfolding operation of the stroller 1.

Figure 10:
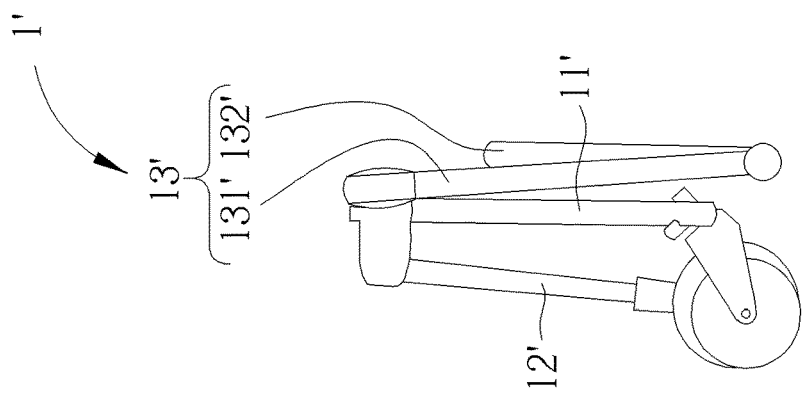
FIG. 8 to FIG. 10 are partial enlarged diagrams of a stroller in different states according to a second embodiment of the present invention.
Figure 9:
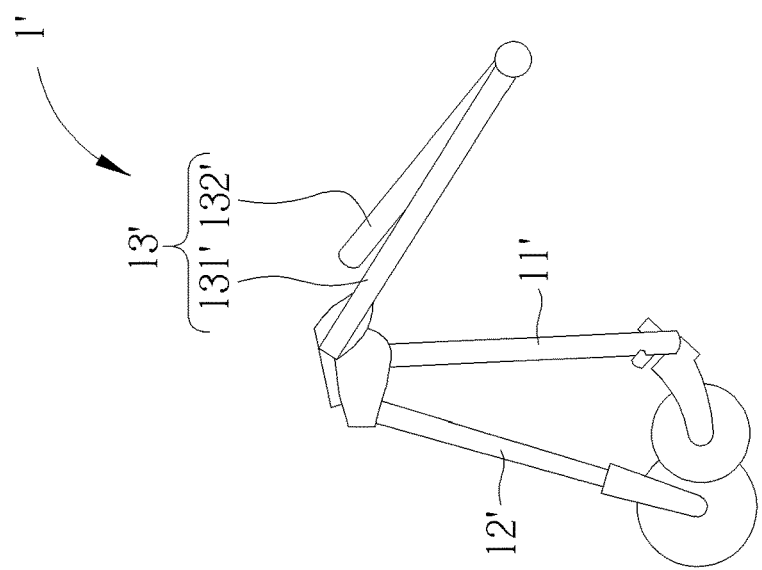
Figure 8:
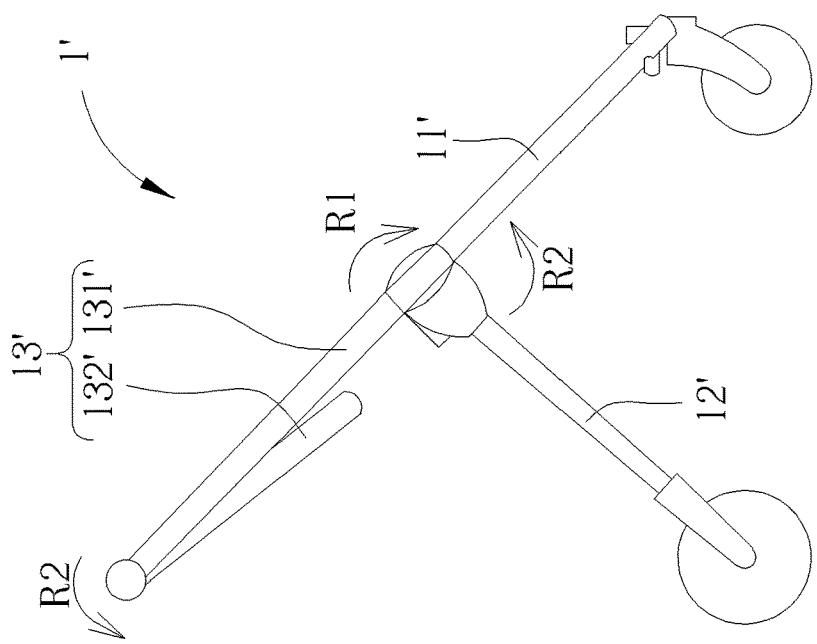

Furthermore, the structure and the configuration of the stroller are not limited to the above-mentioned embodiment. For example, please refer to FIGS. 8 to 10. FIG. 8 to FIG. 10 are diagrams of the stroller 1' in different states according to a second embodiment of the present invention. As shown in FIG. 8 to FIG. 10, different from the first embodiment, an upper handle portion 132' of this embodiment is configured to rotatably fold relative to a lower handle portion 131' in the counterclockwise direction, i.e., the second pivoting direction R2, when an operating component 16' is operated, and a locking component can be driven by the upper handle portion 132' to disengage from a front leg 11' when the upper handle portion 132' rotatably folds relative to the lower handle portion 131' in the counterclockwise direction. Other structure of this embodiment is similar to the one of the first embodiment. Detailed description is omitted herein.

In contrast to the prior, the present invention utilizes the locking component to allow or restrain the rotating movement of the handle assembly relative to the front leg and further utilizes the rotating movement of the handle assembly relative to the front leg to drive the rear leg to rotate relative to the front leg by the linking component. Therefore, the entire stroller is allowed to be folded easily and compactly by disengaging the locking component and then rotating the handle assembly relative to the front leg, which brings convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a front leg;
   a rear leg rotatably connected to the front leg;
   a handle assembly rotatably connected to the front leg;
   a linking component rotatably connected to the handle assembly and the rear leg; and
   a locking component movably disposed on the handle assembly, the locking component engaging with the front leg for restraining a rotating movement of the handle assembly relative to the front leg and further to be driven to disengage from the front leg for allowing the rotating movement of the handle assembly relative to the front leg, the handle assembly and the front leg cooperatively engaging with the rear leg for restraining a rotating movement of the rear leg relative to the front leg in a clockwise direction and a rotating movement of the rear leg relative to the front leg in a counterclockwise direction when the locking component engages with the front leg.

2. The stroller of claim 1, wherein the front leg comprises an engaging component engaging with the locking component.

3. The stroller of claim 1, wherein the handle assembly comprises a first abutting portion, the front leg comprises a second abutting portion, and the rear leg is clamped by the first abutting portion and the second abutting portion cooperatively for restraining the rotating movement of the rear leg relative to the front leg in the clockwise direction and the rotating movement of the rear leg relative to the front leg in the counterclockwise direction.

4. The stroller of claim 1, wherein a rotating connection of the linking component and the rear leg and a rotating connection of the front leg and the rear leg are located in different positions, a rotating connection of the handle assembly and the linking component and a rotating connection of the handle assembly and the front leg are located in different positions, and the handle assembly drives the rear leg to rotate relative to the front leg by the linking component when the handle assembly rotates relative to the front leg.

5. The stroller of claim 1, further comprising a resilient component abutting against the locking component to bias the locking component to engage with the front leg.

6. The stroller of claim 1, further comprising a connecting component connected to the locking component, the connecting component driving the locking component to disengage from the front leg.

7. The stroller of claim 6, further comprising an operating component movably disposed on the handle assembly and connected to the connecting component, and the operating component driving the locking component to disengage from the front leg by the connecting component when the operating component is operated.

8. The stroller of claim 6, wherein the handle assembly comprises a lower handle portion and an upper handle portion, the stroller further comprises a handle pivoting assembly disposed between the upper handle portion and the lower handle portion, the handle pivoting assembly restrains or allows a rotating movement of the upper handle portion relative to the lower handle portion.

9. The stroller of claim 8, wherein the connecting component is further connected to the upper handle portion, and the upper handle portion drives the locking component to disengage from the front leg by the connecting component during the rotating movement of the upper handle portion relative to the lower handle portion.

10. The stroller of claim 8, further comprising an operating component connected to the handle pivoting assembly, the operating component unlocking the handle pivoting assembly for allowing the rotating movement of the upper handle portion relative to the lower handle portion when the operating component is operated.

11. The stroller of claim 10, wherein the operating component is further connected to the connecting component, and the operating component further drives the locking component to disengage from the front leg by the connecting component when the operating component is operated.

12. A stroller comprising:
a front leg;
a rear leg rotatably connected to the front leg;
a handle assembly rotatably connected to the front leg;
a locking component movably disposed on the handle assembly, the locking component engaging with the front leg for restraining a rotating movement of the handle assembly relative to the front leg and further to be driven to disengage from the front leg for allowing the rotating movement of the handle assembly relative to the front leg, the handle assembly and the front leg cooperatively engaging with the rear leg for restraining a rotating movement of the rear leg relative to the front leg in a clockwise direction and a rotating movement of the rear leg relative to the front leg in a counterclockwise direction when the locking component engages with the front leg; and
a linking component rotatably connected to the handle assembly and the rear leg, the handle assembly driving the rear leg to rotate relative to the front leg forwardly by the linking component when the handle assembly rotates relative to the front leg forwardly.

13. The stroller of claim 12, wherein the front leg further comprises an engaging component disposed on the front leg and engaging with the locking component.

14. The stroller of claim 12, further comprising a connecting component connected to the locking component and driving the locking component to disengage from the front leg.

15. The stroller of claim 14, further comprising an operating component movably disposed on the handle assembly and connected to the connecting component, and the operating component driving the locking component to disengage from the front leg by the connecting component when the operating component is operated.

16. The stroller of claim 14, wherein the handle assembly comprises a lower handle portion and an upper handle portion, the stroller further comprises a handle pivoting assembly disposed between the upper handle portion and the lower handle portion, the handle pivoting assembly restrains or allows a rotating movement of the upper handle portion relative to the lower handle portion.

17. The stroller of claim 16, wherein the connecting component is further connected to the upper handle portion, and the upper handle portion drives the locking component to disengage from the front leg by the connecting component during the rotating movement of the upper handle portion relative to the lower handle portion.

18. The stroller of claim 16, further comprising an operating component connected to the handle pivoting assembly, the operating component unlocking the handle pivoting assembly for allowing the rotating movement of the upper handle portion relative to the lower handle portion when the operating component is operated.

19. The stroller of claim 18, wherein the operating component is further connected to the connecting component, and the operating component further drives the locking component to disengage from the front leg by the connecting component when the operating component is operated.

20. The stroller of claim 12, wherein a rotating connection of the linking component and the rear leg and a rotating connection of the front leg and the rear leg are located in different positions, a rotating connection of the handle assembly and the linking component and a rotating connection of the handle assembly and the front leg are located in different positions, and the handle assembly drives the rear leg to rotate relative to the front leg in a first pivoting direction by the linking component when the handle assembly rotates relative to the front leg in a second pivoting direction opposite to the first pivoting direction.

* * * * *